United States Patent [19]
Watson, Jr.

[11] Patent Number: 5,170,748
[45] Date of Patent: Dec. 15, 1992

[54] FLEXIBLE STALL GATE

[76] Inventor: Curtis G. Watson, Jr., 1035 S. Federal Hwy., Del Ray, Fla. 33483

[21] Appl. No.: 803,209
[22] Filed: Dec. 6, 1991
[51] Int. Cl.$^5$ ................................................. A01J 1/00
[52] U.S. Cl. ......................................................... 119/27
[58] Field of Search .................. 119/11, 27, 88, 98, 119/155; 256/23, 24, 73, 19; 49/50, 58

[56] References Cited

U.S. PATENT DOCUMENTS

| | | | |
|---|---|---|---|
| 2,197,489 | 4/1940 | Trulock | 49/50 |
| 4,470,372 | 9/1984 | Norman | 119/27 |
| 5,063,876 | 12/1991 | Harris | 119/20 |

FOREIGN PATENT DOCUMENTS 751367 7/1980 U.S.S.R. ................................. 119/27

Primary Examiner—Gene Mancene
Assistant Examiner—Thomas Price
Attorney, Agent, or Firm—Renner, Otto, Boisselle & Sklar

[57] ABSTRACT

A flexible stall gate for partitioning an animal stall has a rigid frame having a top portion and a bottom portion. The top portion has horizontal and vertical cross-members or screen in a grid pattern and an opening from the top of the gate centrally located along the frontal width to allow the animal to extend its head and neck over the gate out of the stall. A frame of the bottom portion is framed by the downward extension of vertical frame members of the top portion which define the width of the gate and extend below a horizontal member of the bottom of the top portion. The downward extension of the vertical members terminate at the bottom of the stall door frame. The open expanse of the bottom portion between the downward extension of the vertical members is covered by a flexible elastic material which absorbs the impact of animal legs and hooves striking the bottom of the door to prevent injury to the animal and damage to the gate. Hinge pins are provided along one vertical member for hanging the gate in the entry way of a stall.

15 Claims, 1 Drawing Sheet

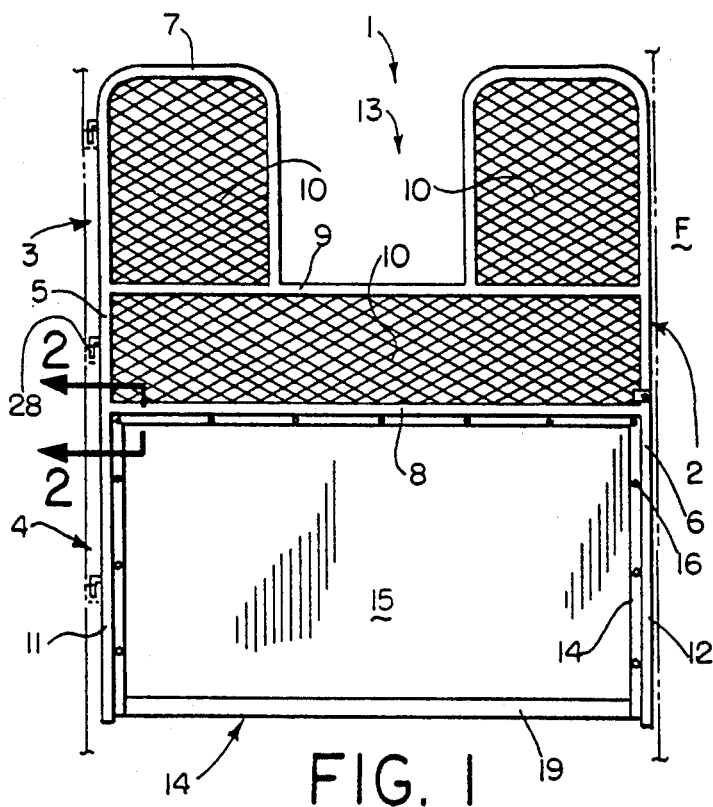
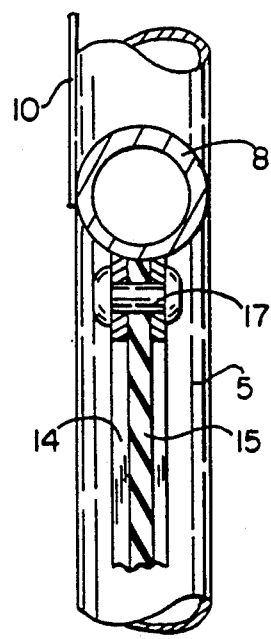
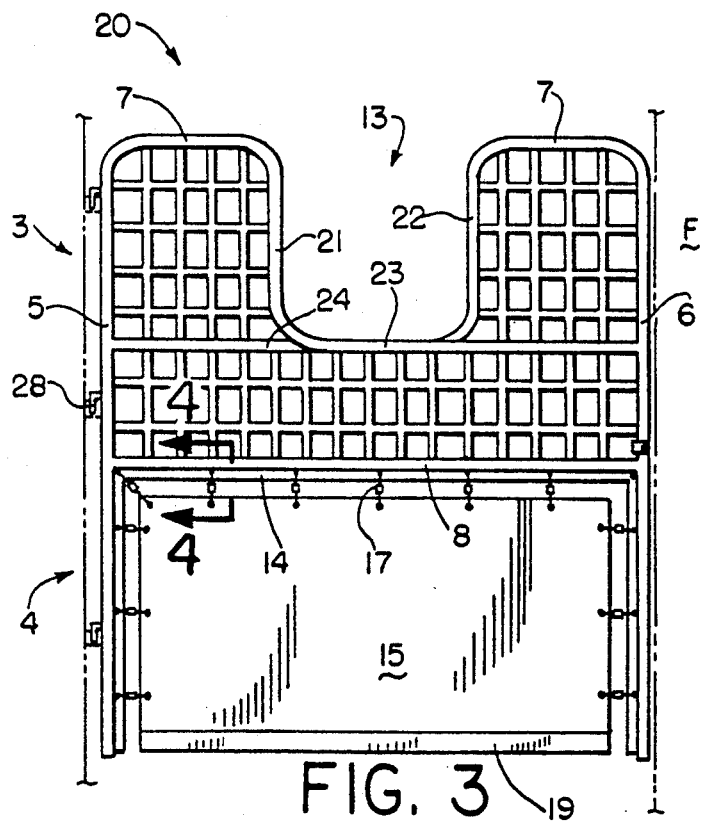
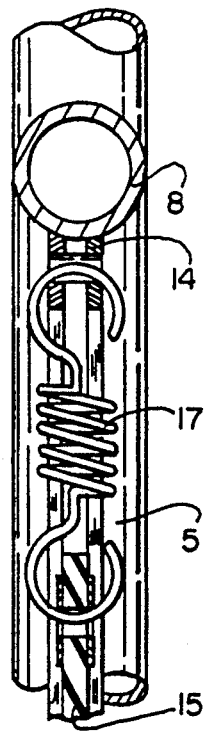

FLEXIBLE STALL GATE

BACKGROUND

I. Field of the Invention

The present invention relates to a stall gate having a flexible section for safe partitioning and retention of animals in stalls.

II. State of the Art

The sheltering of live stock and, in particular, horses is typically accomplished by construction of separate stalls commonly made of wood or a combination of wood and steel. Each stall has an entrance with a hinged lockable gate to allow entrance to and exit from the stall and to retain the animal therein. Once inside the stall, animals commonly face the interior of the gate, looking out of the stall through the gate. As a result, the bottom of the gate is repeatedly kicked by the animal's front legs, knees and hooves which can result in injury to the animal and damage to the gate. Frequent contact of the animals's front legs and hooves with the bottom of the gate is a result of the animals' curiosity to look out of the gate and extend its head through an opening in the top of the gate for feeding or petting. When the animal is facing the rear of the stall, a kick from the more powerful hind legs to the bottom of the gate can incur substantial structural damage to the gate or possibly the animal.

In the case of horse stalls, and in particular stalls for racing horses, a common problem is injury to the horse's front legs, knees and hooves resulting from contact with the bottom of the gate. Having longer more fragile legs than other types of livestock and being especially jumpy and excitable, racing horses are particularly prone to leg, knee and hoof injury in this manner. Horseshoes can be easily knocked loose from the hoof and the hoof chipped and damaged when struck against the hard surface of the interior of the gate, disabling the horse.

It is therefore desirable to provide a stall gate which is effective in retaining the animal in the stall yet absorbs the impact of inevitable kicking of the bottom of the gate to prevent injury to the animal and also to prevent structural damage to the gate. It is further desirable to provide an opening in the top of the gate to allow the animal to extend its head and neck outward from the stall over the gate and place its front legs and hooves directly against a flexible barrier at the bottom of the gate without injury and without damage to the gate.

SUMMARY OF THE INVENTION

A stall gate having a flexible section of safely retaining animals in a stall has been developed which comprises a rigid frame with a top portion and a bottom portion. The frame has two vertical members which define the width of the gate. The bottom of the top portion of the gate is defined by a horizontal member extending between approximate mid-points of the vertical members, however, such member may be adjusted vertically depending on the size of the animals, the stall structure and the like. In one embodiment, the top of the top portion of the gate has two horizontal members extending inwardly from the top of the vertical members and then extending vertically downward at a point about one-third the width of the gate from the respective vertical members and extending horizontally inward again at a point about one-half the height of the top portion of the gate to provide an opening in the top portion of the gate for the animal to extend its head and neck out of the stall over the gate. A series of vertical and/or horizontal cross-members or screen is provided between the horizontal and vertical members defining the top portion. The bottom portion of the gate is defined by downward extension of the vertical members below the horizontal member at the bottom of the top portion to provide an open frame of approximately equal area to the top portion. A flexible resilient material is displaced about the open expanse of the bottom portion of the gate and attached to the downward extensions of the vertical members and to the horizontal member at the bottom of the top portion. The bottom edge of the flexible material between the downward extensions of the vertical members is elastically flexible to allow the animal to kick or step forward into the bottom portion without injury and without damage to the gate. These and other aspects of the invention will become clear to those skilled in the art upon the reading and understanding of the specification that follows.

BRIEF DESCRIPTION OF THE DRAWINGS

FIG. 1 is a front elevation of one embodiment of the stall gate installed in the entry way to a stall;

FIG. 2 is an enlarged cross-section view taken from the line 2—2 in FIG. 1.

FIG. 3 is a front elevation of one embodiment of the stall gate installed in the entry way to a stall.

FIG. 4 is an enlarged cross-section view taken from the line 4—4 in FIG. 3.

The invention will be further described in connection with the attached drawing figures showing preferred embodiments of the invention including specific parts and arrangements of parts. It is intended that the drawings included as a part of this specification be illustrative of the preferred embodiment of the invention and should in no way be considered as a limitation on the scope of the invention.

DETAILED DESCRIPTION OF PREFERRED EMBODIMENTS

Referring now in detail to FIG. 1, there is shown a front elevation of the flexible stall gate having a flexible section, indicated generally at 1, installed in the frame F of an entry way to an empty stall. The gate 1 is defined generally by exterior frame 2 having a top portion 3 and a bottom portion 4. The frontal width of the gate is defined by vertical members 5 and 6. The top portion 3 of the gate extends from horizontal members 7 extending between the top of vertical members 5 and 6 to horizontal member 8 extending between an approximate mid-point of vertical members 5 and 6. A second horizontal member 9 extends between vertical members 5 and 6 and defines the bottom of opening 13 in the top portion 3 of the gate which allows the animal to extend its head and neck beyond the frontal plane of the gate. Horizontal member 9 is positioned approximately at the height of a horse's chest to provide adequate structural rigidity to the gate against sudden forward motion of the horse. Screen 10 covers the areas defined by the top portion 3. The horizontal and vertical members of frame 2 may be constructed, for example, from lightweight structural aluminum or steel or even from wood.

The frame of bottom portion 4 is defined by the downward extensions 11 and 12 of vertical members 5 and 6 respectively below horizontal member 8. Horizontal member 8 defines the top of the frame of bottom portion 4. The frame of bottom portion 4 is left open at the bottom 14 of the gate. The open expanse of bottom portion 4 is covered by flexible elastic belting 15 extending between downward extensions 11 and 12 of vertical members 5 and 6 and from horizontal member 8 down to the bottom edge 19 of the gate. Flexible elastic material 15 may be continuously attached along the length of downward extensions 11 and 12 and horizontal member 8. For example, the flexible elastic material 15 may be wrapped around downward extensions 11 and 12 and horizontal member 8 and then sewn back on to itself for permanent attachment. Alternatively, flexible elastic material 15 may be attached at attachment holes 16 in a flexible elastic material frame 14 provided along the edges of downward extensions 11 and 12 and horizontal member 8.

As shown in FIG. 2, an enlarged cross-section view taken from the line 2—2 in FIG. 1, flexible elastic material 15 extends up into a bottom portion frame 14 and is affixed thereto by fasteners 17 extending through corresponding holes along the edges of flexible elastic material 15 and through holes 16. The bottom edge 19 of flexible elastic material 15 may be reinforced to prevent fraying or stretching from repeated contact by the animal hooves.

Referring now to FIG. 3 there is shown a front elevation of an alternate embodiment of a flexible stall gate, indicated generally at 20, installed in stall door frame F. Top portion 3 is provided with an opening 13 centered about the mid-point of the width of the gate to allow the animal to extend its head and neck out of the stall over the gate. The opening 13 is defined by symmetrical horizontal members 7 which turn vertically downward to vertical legs 21 and 22 to a point approximately one-third the width of the gate from the respective vertical members 11 and 12. Vertical legs 21 and 22 turn inwardly horizontal to horizontal legs 23 and 24 at an approximate mid-point of the height of top portion 3. Horizontal leg 23 extends beyond vertical leg 22 to intersect with vertical member 6. Horizontal leg 24 extends beyond vertical leg 21 to intersect with vertical member 5. It should also be noted that horizontal leg 23 overlaps horizontal leg 24 along the bottom of opening 13 to provide a double thickness of frame members at a centrally located portion of the gate frame thereby contributing strength and rigidity to the gate and the opening 13. The top portion 3 of the gate is shown alternatively provided with a grid arrangement of vertical and horizontal cross members 25. Hinge pins 28 are provided along vertical member 5 to hang the gate in a stall door frame.

The flexible elastic material 15 at the bottom portion 4 of the gate is shown alternatively attached to bottom portion frame 14 by spring fastener means 26. FIG. 4 is an enlarged cross-section view taken from the line 4—4 in FIG. 3 illustrating spring fasteners 26 extending from hole 16 in frame 14 to grommet 27 along the edge of flexible elastic material 15. Spring fasteners 26 lend additional flexure to the bottom portion 4 of the gate to effectively absorb any impact.

The flexible elastic material 15 may be formed of most durable, high impact thermoplastics, elastomers and the like. The material must have sufficient elasticity and strength to withstand constant pounding and impact from the horse's forelegs, knees and hooves and not require frequent replacement. Exemplary of materials that may be utilized for the purpose of this invention include polyamides, polyesters, polyurethanes, ABS resins, the fiber reinforced counterparts of these resins and the like. The flexible elastic material may take the form of a sheet, a webbing, woven filaments and the like.

While preferred embodiments of the invention have been illustrated and described in detail with reference to the preferred embodiments discussed above, it will be evident that various changes and modifications may be made to this preferred embodiments without departing from the scope of spirit of the invention. It is intended, therefore, that the invention be limited only by the scope of the claims which follow.

I claim:

1. A flexible stall gate for partitioning an animal stall comprising a frame having a top portion and a bottom portion, the width of the frame defined by two vertical members, the top portion defined by a horizontal member extending between the top of the two vertical members at the top of the gate, and a horizontal member extending between the two vertical members at an approximate mid-point of the vertical members to provide the bottom of the top portion, and a series of cross-members extending between the horizontal and vertical members of the top portion, the frame of the bottom portion provided by downward extension of the vertical members below the bottom of the top portion, said downward extensions terminating at the bottom of the gate, the top of the bottom portion defined by the horizontal member at the bottom of the top portion and, a flexible material covering the open expanse of the bottom portion and attached to the downward extensions of the vertical members.

2. The gate of claim 1, including a series of vertical cross-members extending between the horizontal members of the top portion across the width of the gate.

3. The gate of claim 1, including a series of horizontal cross-members extending between the vertical members of the top portion along the height of the top portion of the gate.

4. The gate of claim 1, including both vertical and horizontal cross-members extending between the horizontal and vertical frame members of the top portion of the gate.

5. The gate of claim 1, including hinge pins attached to a vertical member of the gate.

6. The gate of claim 1, including a flexible material attached directly to the downward extensions of the vertical members of the bottom portion.

7. The gate of claim 6, wherein said flexible material is also attached to the horizontal member at the bottom of the top portion of the gate.

8. The gate of claim 1, including through holes in the downward extensions of the vertical members of the bottom portion, and through holes in the horizontal member at the bottom of the top portion for insertion of fashioning means to extend to an outer edge of the flexible material covering the open expanse of the bottom portion.

9. The gate of claim 8, wherein said flexible material is held in the open expanse of the bottom portion by spring fasteners extending from the through holes in the vertical and horizontal members to the edges of the flexible material.

10. The gate of claim 1, wherein said flexible material is polyurethane.

11. The gate of claim 1, wherein said flexible material is nylon.

12. The gate of claim 1, wherein said flexible material is woven.

13. The gate of claim 12, wherein the flexible material is woven elastic fiber.

14. The gate of claim 1, wherein a bottom edge of said flexible material between the ends of the downward extensions of the vertical members is reinforced.

15. A flexible stall gate for partitioning an animal stall comprising a frame having a top portion and a bottom portion, the width of the frame defined by two vertical members forming the sides of the top and bottom portions, the bottom of the top portion defined by a horizontal member extending between the two vertical members at an approximate mid-point of the vertical members, and the top of the top portion defined by symmetrical horizontal portions extending inward toward the middle of the width of the gate from the top of the vertical members, said horizontal portions turning downward at a point approximately one-third the width of the gate from the respective vertical member, and turning horizontally inward again at an approximate mid-point of the height of the top portion to define a centrally located opening in the top portion of the gate open to the top of the gate, said bottom portion defined by the downward extension of the vertical members of the frame, below the horizontal member at the bottom of the top portion, and a flexible material disposed and attached about the open expanse of the bottom portion between the downward extension of the vertical members.

* * * * *